Oct. 4, 1949.  A. B. SCHULTZ  2,483,655
AIRCRAFT ARRESTING APPARATUS
Filed July 21, 1947  5 Sheets-Sheet 1

INVENTOR.
ARTHUR B. SCHULTZ
BY
Herbert M. Birch
HIS ATTORNEY.

Oct. 4, 1949.  A. B. SCHULTZ  2,483,655
AIRCRAFT ARRESTING APPARATUS
Filed July 21, 1947   5 Sheets-Sheet 5

INVENTOR.
ARTHUR B. SCHULTZ
BY
Herbert M Birch
HIS ATTORNEY.

Patented Oct. 4, 1949

2,483,655

UNITED STATES PATENT OFFICE 2,483,655

AIRCRAFT ARRESTING APPARATUS

Arthur B. Schultz, Wilmington, Del., assignor to All American Airways, Inc., a corporation of Delaware Application July 21, 1947, Serial No. 762,406

11 Claims. (Cl. 244—110)

The present invention relates generally to an aircraft barrier arresting gear for use on restricted landing surfaces, such as aircraft carriers and more particularly to an energy absorbing device used in conjunction with a brake delay arrangement for a steel ribbon-type of arresting gear. While the invention is disclosed in use on an aircraft carrier, it is equally adaptable to the runway barriers of land-based airports.

The principal object of the present invention is to provide an aircraft arresting device including a steel ribbon adapted to be connected with the barrier cable supported on the runway of aircraft carriers and other restricted landing surfaces, which ribbon is braked as it is reeled out from around a drum to decelerate the landing aircraft.

Another object of the invention is to provide a fluid-pressure actuated braking device retardingly engaging steel ribbons originally coiled in a housing and adapted to be unwound by the engagement of an aircraft in the process of landing on a runway with an arresting barrier connected to said ribbons.

Another object of the invention is to provide a brake delay system adapted for use in conjunction with a steel-ribbon type of arresting gear.

A more specific object is to provide a brake delay surface or covering over a portion of the leading end of a steel ribbon in an arresting gear of the type hereinbefore referred to, whereby slippage of the ribbon results between the brake shoes at the covered portion of the ribbon.

Another or more specific object of the invention is to provide a brake delay device including rollers rolling on the brake shoes and on and with the steel ribbon and delaying the full action of the brake shoes on the ribbon.

Still another object is to provide a brake delay device of simple, durable and inexpensive construction.

With these and other objects in view which will become apparent as the invention is fully understood, the same resides in the novelty of construction, combination and arrangement of elements hereinafter described in detail and distinctly claimed in the appended claims.

The description should be read in conjunction with the accompanying drawings wherein.

Figure 1:
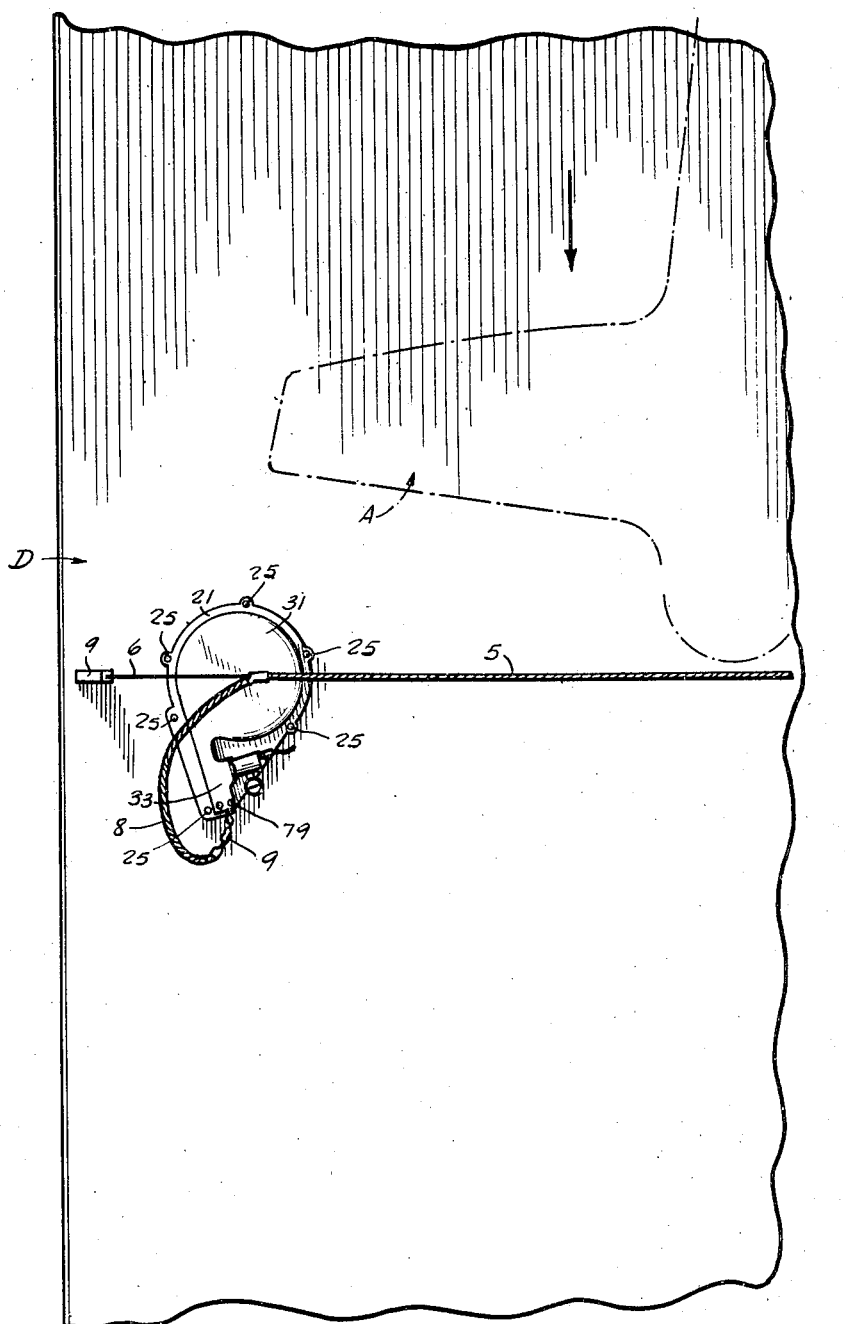
Figure 1 is a top plan of the deck of an aircraft carrier and of an aircraft about to land thereon approaching a barrier connected to one embodiment of the invention.

In the drawings in which like characters of reference designate like or similar elements, Fig. 1 shows in plan the deck D of an aircraft carrier and an aircraft A running thereon and about to engage a cable barrier 5, which is connected at each end to one end of a frangible means 6 preferably in the form of a string or a breakable shock absorbing coupling of undrawn nylon. The other end of this string is attached to a post 9 adjacent the upper end thereof. Either end of the barrier is also secured to one end of a flexible deck pendant 8, the other end of which is received in a socket forming one end of a connector 9 (see Fig. 2). The same terminates at the other end in bifurcations each having an opening registering with an opening in the other bifurcation. A pivot pin 11 is inverted in the openings and an opening of a link 13 disposed with one end between the bifurcations. The other end of the link 13 is pivotally connected to one end of a coupler 15 in such a manner that the axis of the pivotal motion of the link relative to the coupler is at right angles to the pivot axis defined by pin 11. The other end of the coupler has a slot bounded by portions having aligned openings for a pin 17 also passed through corresponding end portions of a pair of steel ribbons 19.

Figure 2:
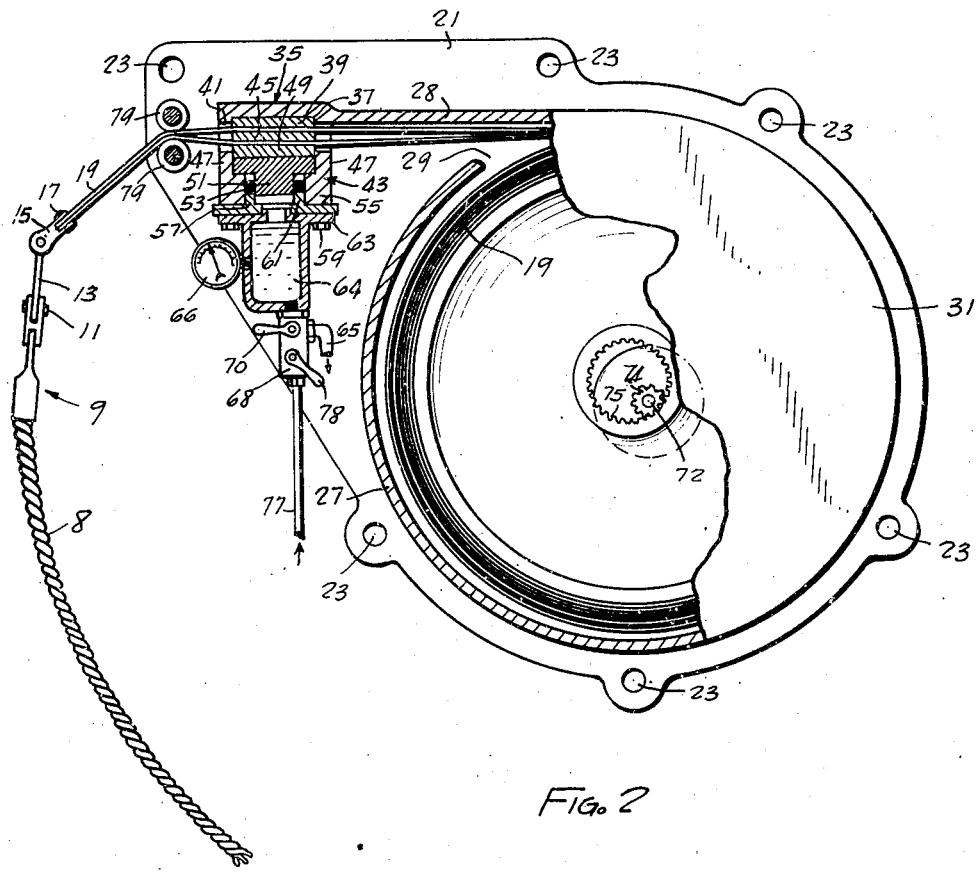
Figure 2 is an enlarged top plan view of such embodiment partly in horizontal section.
Figure 3:
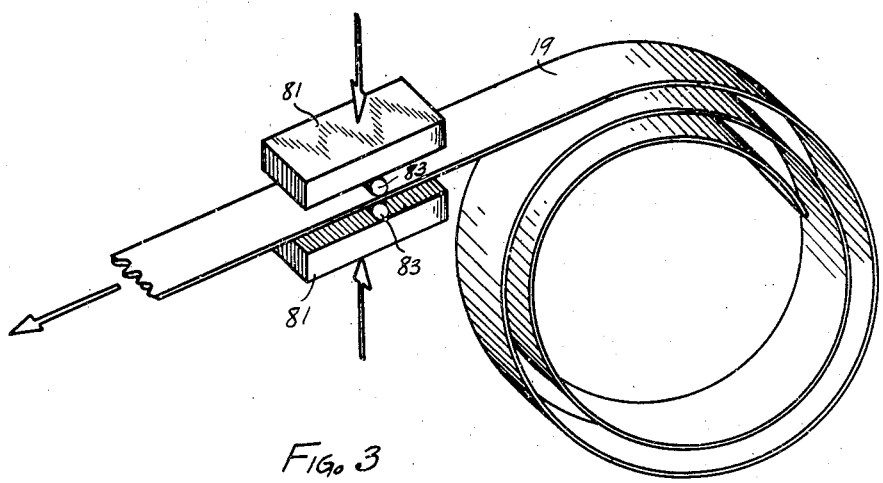
Figure 3 is a perspective view of the principal parts of my brake delay device with the rollers in the initial position of operation and affording an unobstructed view of the brake shoes, rollers and ribbon.
Figure 4:
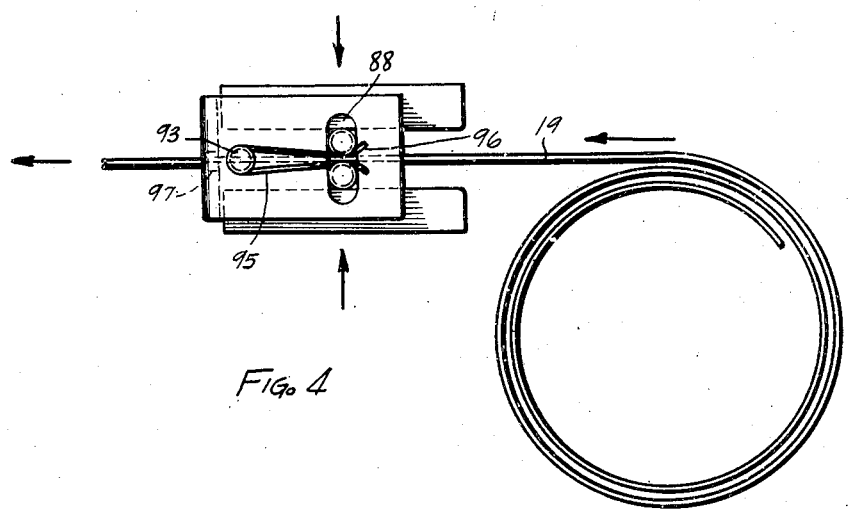
Figure 4 is a side elevation of the structure shown in Fig. 3 and of the roller cage and roller spring.
Figure 5:
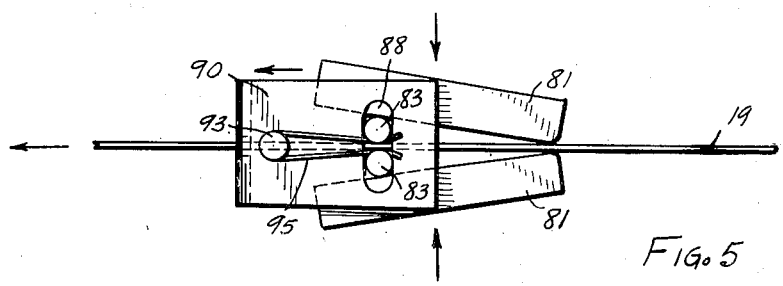
Figure 5 is a top plan view of the structure of Fig. 4 in a second and later position of the brake shoes and rollers.

A frame 21 taking preferably the form of a flat plate has converging edges connected at their diverging ends by a fragmentary generally circular edge and is provided at spaced intervals with holes 23 some of which are formed in outwardly projecting lugs. Fasteners 25 (see Fig. 1) are each passed through a hole 23 and serve to secure the frame in horizontal position to the deck D. The frame plate 21 forms the base of a housing integral therewith or secured to such plate and comprises a wall 27 extending vertically and at right angles to the plate. The wall 27 includes a substantially straight portion 28 and integral with one end thereof an annular portion having a gap 29 for the steel ribbons (Fig. 2). The housing also comprises a circular cover portion 31 disposed substantially parallel to the plate and integral with or fastened to the outer end of the annular portion of the wall 27. To this cover portion is joined a cover part 33 parallel to plate 21 and extending from the outer end of the straight wall portion 28 toward the gap 29 (see Fig. 1). Obviously the cover part 33, the straight wall part 28 and a portion of plate 21 form a guiding channel for the two ribbons 19.

The outer end of this guide channel is connected to a brake housing including a wall 35 forming a laterally offset extension of the straight wall part 28. The offset relation results in a shoulder 37 engaging one end of a fixed brake shoe 39, the other end of which engages a flange 41 extending from wall 35.

The outer end of wall 35 is joined to or integral with one end of a cover section 43 which at either edge is spaced from flange 41 and shoulder 37 over plate 21. This spacing results in aligned openings for the ribbons 19. One of the openings is a continuation of the guide channel. Each of the ribbons 19 are provided at their leading ends from the coupler pins 17 with brake delay means, such as small sheets of wax paper or a grease coating. This brake delay means extends for only a portion of the ribbons 19.

The brake housing described provides a guide for a movable brake shoe 45 which is disposed between the ribbons and is also aligned with the openings resulting from the spacing between plate 21 and cover section 43.

This section 43 is also connected to plate 21 by a pair of opposite parallel walls 47 each having an inner end contacting with its inner side an end of a movable brake shoe 49 aligned with shoes 39 and 45. The outer side of shoe 49 is engaged by the inner face of a plunger 51 having on its opposite face a central leg. The same is slidable between opposite packings 53 each facing with its outer side the inner face of a thickened wall extension 55 of wall 47.

A stuffing box 57 has a plate overlying the end faces of wall extensions 55 and bolted thereto by bolts 59 and has a central opening to admit fluid pressure against the free face of the leg of plunger 51. The stuffing box also includes flanges 61 extending from its inner side and on opposite sides of the pressure opening and each engaging an outer edge of the packing 53.

Between the head of each bolt 59 and the adjacent stuffing box plate portion is clamped a flange 63 of a pressure chamber 64 the interior of which communicates with a pressure gauge 66. To the outer end of the pressure chamber is attached a valve housing 68 containing a two-way valve means, of well-known form, not shown, for establishing a communication between the interior of the chamber 64, the return pipe line 65 and the inlet line 77. Such connection is established by the operation of a handle 70 to open the valve to supply fluid from line 77 to pressure chamber 64 to operate the brake shoes or to close off the feed to chamber 64 and return the fluid to a reservoir, not shown. The valve housing also contains fluid inlet control valve means for admitting fluid pressure supplied by line 77 which leads from a fluid supply reservoir (not shown). This last named valve is manipulatable by handle 78.

The steel ribbons are guided by a pair of rollers 79 journaled on plate 21.

When the aircraft engages the barrier cable 5 the frangible means 6 supporting its ends will break and the barrier engaging the engaging part of the craft will impart pull on the ribbons and uncoil the same. If fluid pressure is admitted to the chamber 64, the brake described will decelerate the ribbons and thus impede the forward movement of the aircraft. As the brake shoes are actuated by the fluid pressure, there will be a delay in their braking action due to the covering of wax sheets or grease over a portion of the steel tape, until the shoes reach the uncovered portion at which time the brake shoes take hold completely.

After the aircraft is arrested by the barrier mechanism, there is provided means to rewind or retrieve the ribbon, which means comprises a motor, not shown, with a rotor shaft 72. The shaft 72 of the motor carries a pinion 74, which meshes with an internal gear 75 journaled in the plate 21 and cover 31. The exterior circumference of the gear 75 is secured to the inner ends of the steel ribbons coiled in the housing defined by parts 21, 27 and 31. Thus, by closing a suitable switch connected to a power source and the motor, both not shown, the entire arresting device may be reset for future operation.

The brake delay device of the invention, in Figs. 3–9, is shown used with a single ribbon 19 and includes a pair of brake shoes 81 each subjected to a predetermined force having a centrally located resultant indicated by the arrows pointing toward a brake shoe. Each shoe engages with its intermediate portion a roller 83 initially positioned in alignment with the resultant and engaging one side of the ribbon.

Either end portion of a roller projects beyond the side of its shoe and through a slot 88. Each slot 88 forms a journal for corresponding ends of a pair of the rollers 83—83.

Each leg of a roller cage carries on its outer side a lug 93 engaging within the bight portion of a generally U-shaped spring 95. Either leg of such spring has at its free end an outwardly bent part 96 adapted to bear on the end of a roller projecting outwardly of its cage and urging the roller toward its brake shoe. The bight part of each roller cage has a central passage 97 for the ribbon 19.

The latter in its travel toward the left (Figs. 3–6) causes the rollers to roll on their shoes toward the left-hand end of the latter with a peripheral speed about one-half of the linear speed of the ribbon. The rollers move their cage toward the left while the left-hand end of either shoe rises and the right-hand shoe end is lowered to the position of Fig. 5, so that the corner edge between that end and the ribbon-engaging face contacts the ribbon 19.

Figure 6:
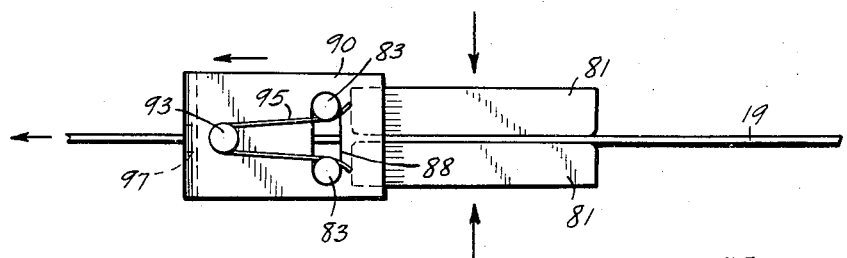
Figure 6 is a top plan view of the structure of Fig. 4 in a third and still later position of the rollers and brake shoes engaging the ribbon with their full force.

While the shoes are in parallelism the friction between the rollers and ribbon is very small. After the shoes have tilted to the position of Fig. 5, additional friction between the rear end corners of the shoes and the ribbon develops. The friction attains its maximum value when the full faces of the shoes contact the ribbon as shown in Fig. 6.

Figure 7:
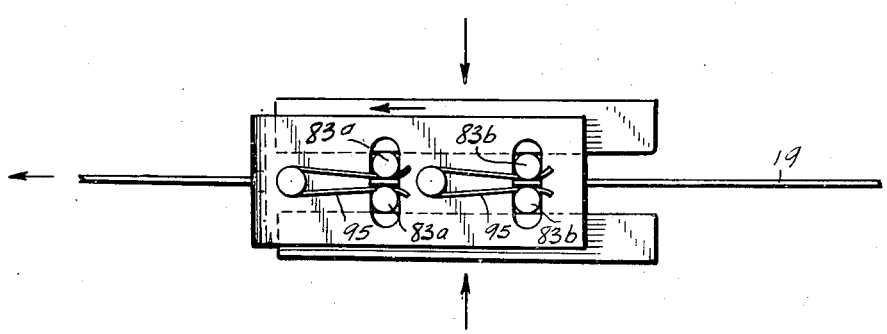
Figure 7 is a top plan view of a modification employing two pairs of rollers.

Fig. 7 shows two pairs of rollers, 83a and 83b, journaled in a single case.

Figure 8:
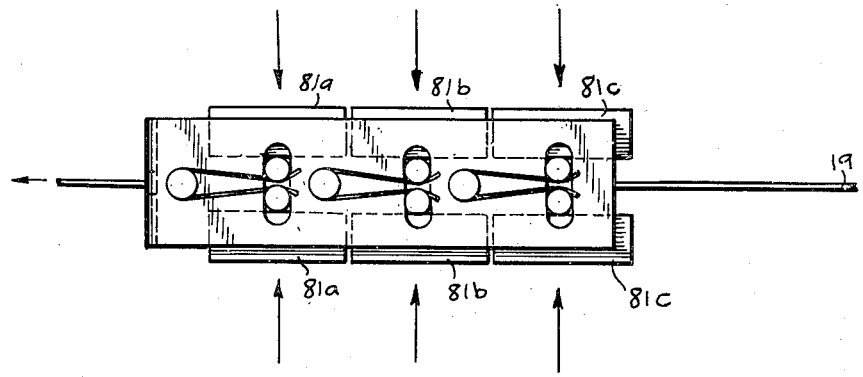
Figure 8 is a top plan view of an additional modification employing three pairs of rollers.

Fig. 8 shows three pairs of shoes, 81a, 81b, and 81c each engaged by a roller. Each pair of rollers is mounted in aligned slots in the leg of a single roller cage. As the cage moves to the left the rear pair of shoes first engages the ribbon, then the intermediate pair and finally the front pair.

Figure 9:
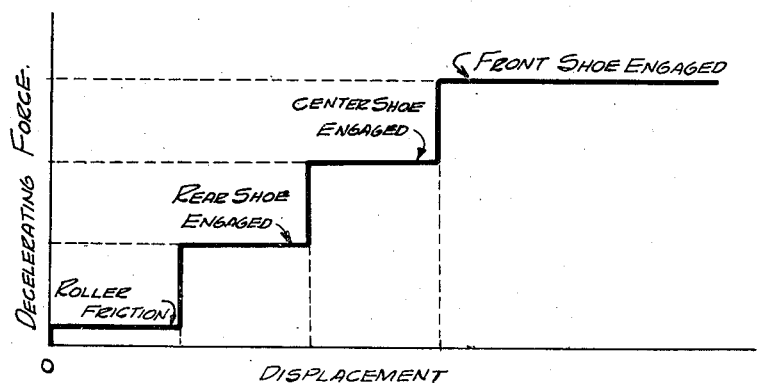
Figure 9 is a diagram illustrating the increase of the friction with the change of the position of the brake delaying rollers of Fig. 8.

Fig. 9 shows a stepped diagram of roller and shoe movement expressing the friction as a function of the position of the rollers.

While the foregoing specification describes and the drawings illustrate the specific details of the various embodiments of the invention, it is to be understood that the same is not limited by these details and is therefore susceptible to changes and modifications within the scope of the subjoined claims without a departure from the spirit of the invention.

What is claimed is:

1. A brake delay device for barrier arresting gear and the like comprising a ribbon, brake shoes disposed on either side of said ribbons, a roller between a shoe and said ribbon, means for journaling said rollers, and means carried by said first means for urging said rollers against their shoes.

2. A brake delay device for barrier arresting gear and the like comprising a ribbon, a pair of brake shoes each disposed on one side of said ribbon, roller means each between a shoe and said ribbon, means for journaling said roller means, and other means carried by said first means for urging said roller means against their shoes.

3. A brake delay device for barrier arresting gear and the like comprising a ribbon, brake shoes disposed on either side of said ribbons, a roller between a shoe and said ribbon, means embracing said shoes for journaling said rollers, and means carried by said first means for urging said rollers against their shoes.

4. A brake delay device for barrier arresting gear and the like comprising a ribbon, a plurality of brake shoes on either side of said ribbon, rollers each between a shoe and said ribbon, a common means for journaling said rollers, and means carried by said first means for urging said rollers against their shoes.

5. A brake delay arrangement for aircraft barrier arresting gear and the like comprising friction brake shoes, a coil of ribbon adapted to be unwound between said brake shoes, and means between said ribbon and said brake shoes adapted to reduce the friction between said shoes and the ribbon as said ribbon begins to be uncoiled by an aircraft engaging the barrier.

6. In a barrier of the class described, an energy absorbing motion arresting device comprising a pair of superimposed elongated flexible means having one of their respective ends connected to a side of the barrier, anchored means for housing each of said flexible means in the form of a coil, brake means for retarding the uncoiling of said flexible means, brake delay means for each of said flexible means operable upon the said flexible means for a predetermined period of the initial uncoiling thereof and means for re-coiling the said flexible means for reuse.

7. In a barrier of the class described, an arresting gear comprising a ribbon, brake shoes mounted on each side of the ribbon, said ribbon being flexible and connected to the barrier, a rotatable drum for reeling and unreeling said ribbon between the brake shoes, brake delay means normally between the brake shoes and each adjacent surface of the ribbon, and means to actuate the brake shoes for decelerating the unreeling of said ribbon after a predetermined period of operation of the said brake delay means.

8. In an aircraft barrier, a rotatable drum, elongated flexible means mounted around the drum connected at one end to the aircraft barrier and anchored to said drum at the other end, brake means adapted to engage said flexible means as it unwinds from the drum, and brake delay means operatively associated between said flexible means and said brake means for a portion of the length of the flexible means.

9. As an article of manufacture, an energy absorbing device comprising a pair of superimposed metal ribbons connected together at each free end thereof, a reel connected to one of said connected together free ends for the ribbons to wind and unwind upon, a supporting base for rotatably mounting the reel, brake means supported by said reel base for frictionally engaging the respective flat surfaces of each ribbon during unwinding of the same, and brake applying means for said brake means.

10. As an article of manufacture, an energy absorbing device comprising flexible elongated strip means, a rotatable reel for the strip means to wind and unwind upon, a reel support, a fluid brake cylinder carried by the reel support connected to a source of pressure and brake members in the cylinder engageable with the strip means when pressure is supplied from the said pressure source into the cylinder.

11. A shock absorber for retarding loads comprising a rotatable drum, elongated flexible means mounted around the drum connected at one end to a load to be retarded and anchored to said drum at the other end, brake means adapted to engage said flexible means as it unwinds from the drum, and brake delay means operatively associated between said flexible means and said brake means for a portion of the length of the flexible means.

ARTHUR B. SCHULTZ.

REFERENCES CITED

The following references are of record in the file of this patent:

UNITED STATES PATENTS

| Number | Name | Date |
|---|---|---|
| 337,940 | Emmons | Mar. 16, 1886 |
| 1,574,529 | Abraham | Feb. 23, 1926 |
| 1,789,653 | Hoyt | Jan. 20, 1931 |
| 2,237,106 | Minert | Apr. 1, 1941 |
| 2,295,205 | Fraser | Sept. 8, 1942 |
| 2,306,680 | Yesulaites | Dec. 29, 1942 |

FOREIGN PATENTS

| Number | Country | Date |
|---|---|---|
| 26,280 | France (Addition to 546,995) | June 12, 1923 |
| 287,189 | Great Britain | Mar. 12, 1928 |